July 20, 1948.
W. D. MACGEORGE
RATE OF LOADING CONTROL FOR
MATERIALS TESTING MACHINES
Filed July 11, 1944
2,445,682
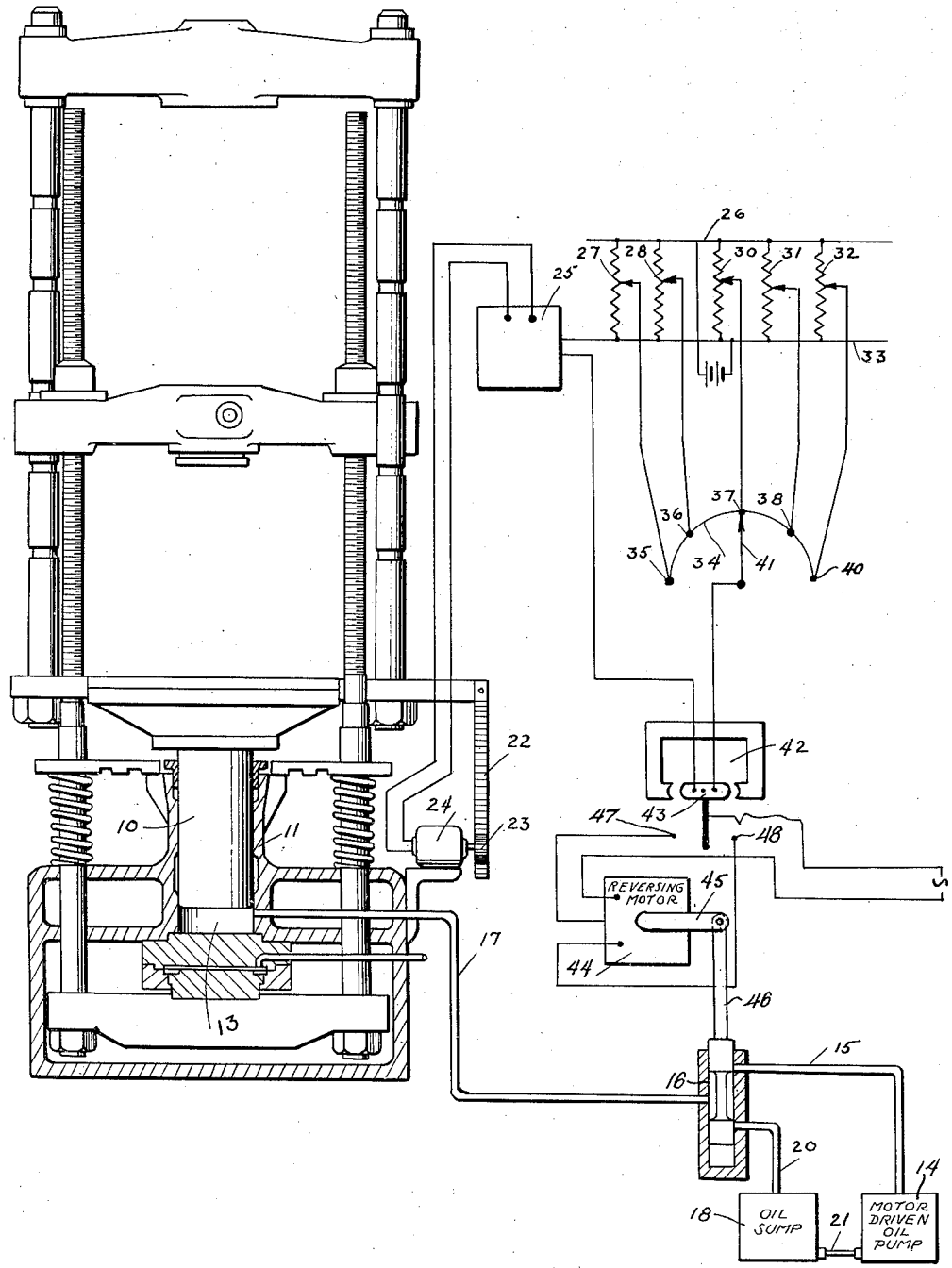
INVENTOR
William D. Macgeorge
BY
ATTORNEY Patented July 20, 1948

2,445,682

UNITED STATES PATENT OFFICE 2,445,682

RATE OF LOADING CONTROL FOR MATERIALS TESTING MACHINES

William D. Macgeorge, Drexel Hill, Pa., assignor to The Baldwin Locomotive Works, a corporation of Pennsylvania Application July 11, 1944, Serial No. 544,399

7 Claims. (Cl. 73—90)

This invention relates to program controllers, pertaining particularly to controllers for hydraulic testing machines which insure that the head motion of the ram thereof progresses at a selected uniform rate.

There are so many factors by which the rate of head motion or feed of the hydraulic ram of a hydraulic testing machine may vary from a given uniform rate that it may be stated as a practical matter that under all loads the head motion always changes during tests, and such fluctuations or changes in the particular rate of feed or head motion are harmful and militate against the accuracy of the given test.

While this factor has been recognized in the past, no previous efforts to insure uniform head motion have been more than approximately successful, as they have depended upon changes in pressure or visual observation and the like and not upon the actual change in head motion itself as a controlling agency.

It is among the objects of the invention: to provide improvements in program controllers; to provide improvements in hydraulic testing machinery; to provide a control for the supply of oil under pressure which is caused to operate as a function of variations in the rate of movement or head motion of a hydraulic ram; to provide an electrical controlling system arranged to be selectively energized to preselect the rate of speed of the associated hydraulic equipment to variations of which the control equipment is responsive; to overcome the disadvantages of previous efforts to solve the problem of uniform head motion; to maintain a close "follow-up" of head motion with its actuating source whereby fluctuations from a given rate are immediately compensated to re-establish the given rate; and other objects and advantages of the invention will become more apparent as the description proceeds.

In the accompanying drawing, the figure represents a schematic diagram of a fragment of a hydraulic testing machine and its associated hydraulic system, and the electrical controlling system operatively and selectively associated therewith.

Referring to the drawing, the hydraulic ram 10 of a testing machine is mounted for testing machine movement in and relative to a cylinder 11, by means of oil or other fluid pressure in the compression space 13, furnished by the oil pump 14 and passing through supply line 15, valve 16, and common supply and drainage line 17, to the space 13 in cylinder 11. As is usual with such hydraulic systems, a sump or reservoir 18 is connected by exhaust or drainage line 20 to the valve 16, and by a supply line 21 to the intake of the oil pump 14. As thus described the assembly is conventional with hydraulic testing machines, and the ram 10 is arranged to test a specimen as a function of its head motion. Illustratively, the testing movement is one that is outwardly of the cylinder shown. It is of prime importance that the rate of feed of the ram 10 be at a constant rate, although this does not necessarily follow a given valve setting, due to such factors as leakage, elongation, slippage, and the like. It will be understood that the rate of feed or head motion of the ram can be varied by manipulations of the valve 16. It is conventional that after the readings are completed proper actuation of the valve both enables the cylinder to drain its fluid contents back through common supply and drainage line 17, valve 16, drainage line 20, to the sump 18, while also closing off the supply through supply line 15 from the pump 14.

In order to maintain a constant rate of ram movement or head motion by properly manipulating the valve 16 during the testing operations, it is necessary that the valve change be as a function of a deviation of speed of the ram 10 from a preselected speed rate. To this end an electrical generator is energized by the ram and its output is caused to balance with or against a preselected voltage of a program controller system, to maintain a valve setting, and the system is arranged to change the valve setting in the proper degree and sense to accord with the degree and sense of unbalance between the generated voltage and the preselected voltage. Thus, a rack 22 is mounted for movement with the traveling ram 10, and is in constant mesh with the pinion 23 of the generator 24. The generator may be either a D. C. generator or an A. C. generator, according to choice and the output of the generator is fed to an amplifying unit 25, the attributes and characteristics of which are, again, a matter of choice and selection. The choice is as to whether the generator 24 is A. C. or D. C. If the generator 24 is A. C., preferably the amplifier unit 25 includes a rectifying unit or element also. A source of D. C. of constant value is fed to the upper connector 26 of a program selector comprising a plurality of voltage dividers or potentiometers, respectively 27, 28, 30, 31, 32, etc. in parallel, the lower ends of which are joined to the common connector 33, which latter is also in the line with the constant value D. C. source as shown. Each voltage divider or unit of the program selector of a predetermined value calibrated so as to accord with predetermined rates of uniform head motion, has a tap leading to the sweep selector switch assembly 34 containing the respective poles or contacts 35, 36, 37, 38, 40, etc. in circuit respectively with the taps of the respective voltage dividers 27, 28, 30, 31, 32, etc. The switch assembly 34 has a movable contact sweep arm 41 arranged for manual adjustment, or otherwise, so as to close a circuit with a desired selected voltage divider or program predetermined in accordance with the selected rate of speed or head motion of the ram for the particular given test situation. A relay 42 has a coil 43 in circuit with the switch arm 41, and the other lead therefrom extends to one lead of the amplifier unit 25. The other lead of the amplifier unit 25 is connected to the common connector 33 of the program selector. The relay 42 has a neutral setting in which the relay is shown comporting with maintenance of the established valve setting and the relay is also operative to selectively establish the circuits through the respective relatively reversing fields of the motor 44 to drive it and the coupled valve 16 in one way or the other according to the direction of unbalance of the relay 42. The motor 44 has a driven arm 45, the free end of which is in engagement with the movable element 46 of valve 16 to vary the valve setting and the flow of oil pressure from the pump 14 to the compression space 13 of the cylinder, to vary the rate of head motion of the ram 10.

It will be understood that the output of the generator is constant as the rate of progress of the ram is at a uniform rate, and if the constant rate is the same as that which is preselected in the program selector in accordance with the peculiarities of the instant test being made, the output of D. C. or rectified A. C. of the generator and amplifier will just balance the particular effective D. C. from the constant source in the program selector. The relay coil 43, therefore, will not be energized and the respective reversing fields of the motor 44 will be balanced in degree of energization or lack of energization, and the valve 16 will have a fixed and constant oil-transmission factor. If, on the other hand, the rate of feed or head motion of the ram 10 varies, then instantaneously the output of the generator also varies and either underbalances or overbalances the proportionate preselected D. C. input of the program selector, which unbalance energizes the relay 42 in the proper direction to close either contact 47 or 48 and energizes the appropriate field of the motor 44 inversely as the direction of unbalance to increase or decrease the rate of head motion of the ram 10 by changing the setting of valve 16. As soon as the ram either accelerates or decelerates in its rate of head motion to the initial rate for which the program was preselected, the output of the generator will correspondingly and substantially instantaneously change, and when the rate of head motion and therefore generated voltage is proper, will reestablish electrical balance, will cause the relay 42 to move to its mid-position, and will thus stop further change in the setting of the valve 16.

It is believed that the simplicity, accuracy and general advantages of the assembly will be clearly understood.

I claim:

1. In machines having a movable element, means for selecting a rate of head motion of the movable element, fluid power operated mechanism to actuate said movable element, means for controlling supply of fluid to and exhaust of fluid from said power mechanism, and means responsive to fluctuations of the rate of head motion of the movable element from the preselected rate to oppositely render said supply and exhaust means effective and thereby vary the rate of head motion to reestablish the selected rate of head motion thereof.

2. In machines of the hydraulic type, comprising a hydraulic cylinder, a piston relatively movable in the cylinder, a pump, an adjustable valve between the pump and the cylinder as the only control for the pressure in the cylinder and arranged to vary the pressure therein as functions of valve movement only, means movable in synchronism with and as a function of the rate of movement of said piston, means generating a voltage as a function of the movement of said means, an electrical system, means for balancing in the system the generated voltage against a known predetermined voltage, and means for adjusting said valve and thus varying the rate of movement of the said piston as a function of the relative balance or unbalance of the generated and predetermined voltages.

3. In a machine having a hydraulic ram whose rate of motion is to be controlled, a hydraulic system for actuating the ram, means in the hydraulic system for varying the rate of actuation of the ram, a control system for varying the setting of the rate-varying means in the hydraulic system as a function of the rate of movement of said ram, said control system comprising means having an electrical output varying as a function of the rate of movement of said ram, and means for utilizing the electrical output to actuate the control system.

4. In a machine having a hydraulic ram, a hydraulic system for actuating the ram, means in the hydraulic system for varying the rate of actuation of the ram, a control system for varying the setting of the rate-varying means in the hydraulic system as a function of the rate of movement of said ram, said control system comprising means having an electrical output varying as a function of the rate of movement of said ram, means for producing an output of a predetermined known electrical value, and means for balancing said respective outputs, a relay operated by unbalance of said outputs, and an electric motor operated by the relay for controlling the setting of the rate varying means.

5. In a machine having a hydraulic ram, a hydraulic system including a valve for controlling the rate of application of ram-position-varying fluid pressure, a control system comprising means for predetermining an impressed voltage, a motor for varying the position of the valve, a relay controlling the field circuits of said motor, means for generating a voltage as a function of the movement of said ram, and means for impressing the generated voltage upon the control system in opposition to the first mentioned impressed voltage to establish a condition of balance or absence of balance therebetween, and said relay functioning as a result of relative unbalance of said impressed voltages to actuate the control toward reestablishment of the rate of progress of the ram coordinated with said predetermined impressed voltage.

6. In a machine having a ram, a ram actuating system including means for controlling the rate of head motion of the ram, a control system, a motor for actuating said controlling means, a relay for controlling said motor, means for generating a voltage as a function of the movement of said ram, means for impressing the generated voltage on said controlling means, and means for impressing a voltage on said control system in opposition to the generated voltage, means coupling said relay to the control system whereby the relay is neutral during conditions of balance between the respective impressed voltages and whereby the relay is actuated and the controlling means is modified to change the rate of head motion in the proper sense depending upon the sense of preponderance of voltage of the said impressed voltages as the generated voltage varies.

7. In a machine having a ram, a ram actuating system including means for controlling the rate of head motion of the ram, a control system, a motor for actuating said controlling means, a relay for controlling said motor, means for generating a voltage as a function of the movement of said ram, means for impressing the generated voltage on said controlling means, means for impressing a voltage on said control system in opposition to the generated voltage, means coupling said relay to the control system whereby the relay is neutral during conditions of balance between the respective impressed voltages and whereby the relay is actuated and the controlling means is modified to change the rate of head motion in the proper sense depending upon the sense of preponderance of voltage of the said impressed voltages as the generated voltage varies, and means for predeterminedly selecting a desired effective impressed voltage of a series of different effective impressed voltages to accord with a desired coordinated rate of head motion.

WILLIAM D. MACGEORGE.

REFERENCES CITED

The following references are of record in the file of this patent:

UNITED STATES PATENTS

| Number | Name | Date |
|---|---|---|
| 1,836,992 | Schade et al. | Dec. 15, 1931 |
| 2,030,457 | Lewis | Feb. 11, 1936 |
| 2,120,331 | Troxell | June 14, 1938 |
| 2,296,160 | Gross | Sept. 15, 1942 |
| 2,344,133 | Davis, Jr. | Mar. 14, 1944 |
| 2,388,256 | Davis, Jr. | Nov. 6, 1945 |